United States Patent [19]
Kowshik et al.

[11] Patent Number: 5,625,544
[45] Date of Patent: Apr. 29, 1997

[54] CHARGE PUMP

[75] Inventors: Vikram Kowshik, Fremont; Andy Teng-Feng Yu, Palo Alto, both of Calif.

[73] Assignee: Programmable Microelectronics Corp., San Jose, Calif.

[21] Appl. No.: 639,280

[22] Filed: Apr. 25, 1996

[51] Int. Cl.$^6$ .................. H02M 3/18; H02M 7/00
[52] U.S. Cl. .................. 363/59; 363/60; 327/536
[58] Field of Search .................. 363/59, 60; 327/536; 365/226

[56] References Cited

U.S. PATENT DOCUMENTS

| | | | |
|---|---|---|---|
| 5,036,229 | 7/1991 | Tran | 327/536 |
| 5,216,588 | 6/1993 | Bajwa et al. | |
| 5,280,420 | 1/1994 | Rapp | 363/59 |
| 5,301,097 | 4/1994 | McDaniel | 363/60 |
| 5,398,001 | 3/1995 | Rapp . | |
| 5,559,687 | 9/1996 | Nicollini et al. | 363/60 |

*Primary Examiner*—Stuart N. Hecker
*Attorney, Agent, or Firm*—Skjerven, Morrill, MacPherson, Franklin & Friel; William L. Paradice, III

[57] ABSTRACT

A charge pump circuit including N stages of diode-capacitor voltage multipliers clocked so as to convert a low voltage received from a supply voltage to a high voltage at an output terminal thereof employs an output stage to improve the efficiency of the charge pump. The output stage includes first and second legs each coupled to the output terminal, where the first leg provides current to the output terminal during low transitions of the clock signal and the second stage provides current to the output terminal during high transitions of the clock signal. In some embodiments, the numerous one of the above-mentioned charge pump circuit may be connected in parallel to achieve even greater output currents. Thus, unlike conventional charge pump circuits, a substantially constant current is provided to the output terminal throughout the period of the clock signal, thereby increasing the average total current provided to the output terminal and, thus, increasing the driving capability of the charge pump circuit.

20 Claims, 6 Drawing Sheets

CHARGE PUMP

BACKGROUND

1. Field of the Invention

The present invention relates to power converters and more specifically to high efficiency charge pump circuits.

2. Description of Related Art

Charge pump circuits are often required within integrated circuit's (IC's) to convert a low voltage to a high voltage.. Typically, such charge pump circuits employ a series of clocked diode-capacitor voltage multiplier circuits, as shown in FIG. 1. Such charge pump circuits generate only a small amount of output current, typically less than 100 μA, thereby limiting their driving ability. Increasing the size of the capacitors to provide a greater output current not only undesirably increases the size of the charge pump circuit but also may lead to increased noise.

The output; voltage $V_{pp}$ of charge pump circuit 100 is a function of the input power supply, the number of pump stages, the clock frequency, and the load current at the output terminal. This relationship may be expressed as:

$$V_{out} = V_{CC} - N \left[ \left( \frac{C}{C+C_s} \right) V_{CC} - V_{PN} \right] - V_{PN} - \frac{NI_{out}}{(C+C_s)f_e}$$

where $V_{CC}$ is the power supply, N is the number of pump stages, $V_{PN}$ is the forward voltage drop across each of diodes $D_1$–$D_N$, $I_{out}$ is the load current, $f_e$ is the effective clock frequency, and $C_s$ is the parasitic capacitance at each of the clocked nodes along the diode chain.

In U.S. Pat. No. 5,216,588, Bajwa et al disclose a charge pump circuit which may increase output current to approximately 8 mA by providing a plurality of parallel-connected voltage diode-capacitor voltage multiplier circuits. The plurality of voltage multiplier circuits are switched at different times during the clock frequency to minimize noise generation. Although improving performance over more conventional charge pump circuits, the greater output current is realized by the addition of parallel diode-capacitor voltage multipliers, thereby significantly increasing the size and complexity of the charge pump.

It would thus be advantageous for a charge pump circuit to provide a greater current driving capability without significantly increasing the size of the charge pump circuit.

SUMMARY

In accordance with the present invention, a charge pump circuit including N stages of diode-capacitor voltage multipliers clocked so as to convert a low voltage received from a supply voltage to a high voltage at an output terminal thereof employs an output stage to improve the efficiency of the charge pump. The output stage includes first and second legs each coupled to the output terminal, where the first leg provides current to the output terminal during low transitions of the clock signal and the second stage provides current to the output terminal during high transitions of the clock signal. Thus, unlike conventional charge pump circuits, a substantially constant current is provided to the output terminal throughout the period of the clock signal, thereby increasing the average total current provided to the output terminal and, thus, increasing the driving capability of the charge pump circuit. In some embodiments, a plurality of the above-mentioned charge pump circuit may be connected in parallel to achieve even greater output currents.

DETAILED DESCRIPTION

The following includes a detailed description of the best mode contemplated for implementing the present invention. Accordingly, the description below is intended to be merely illustrative and should not be construed in a limiting manner.

Figure 2:
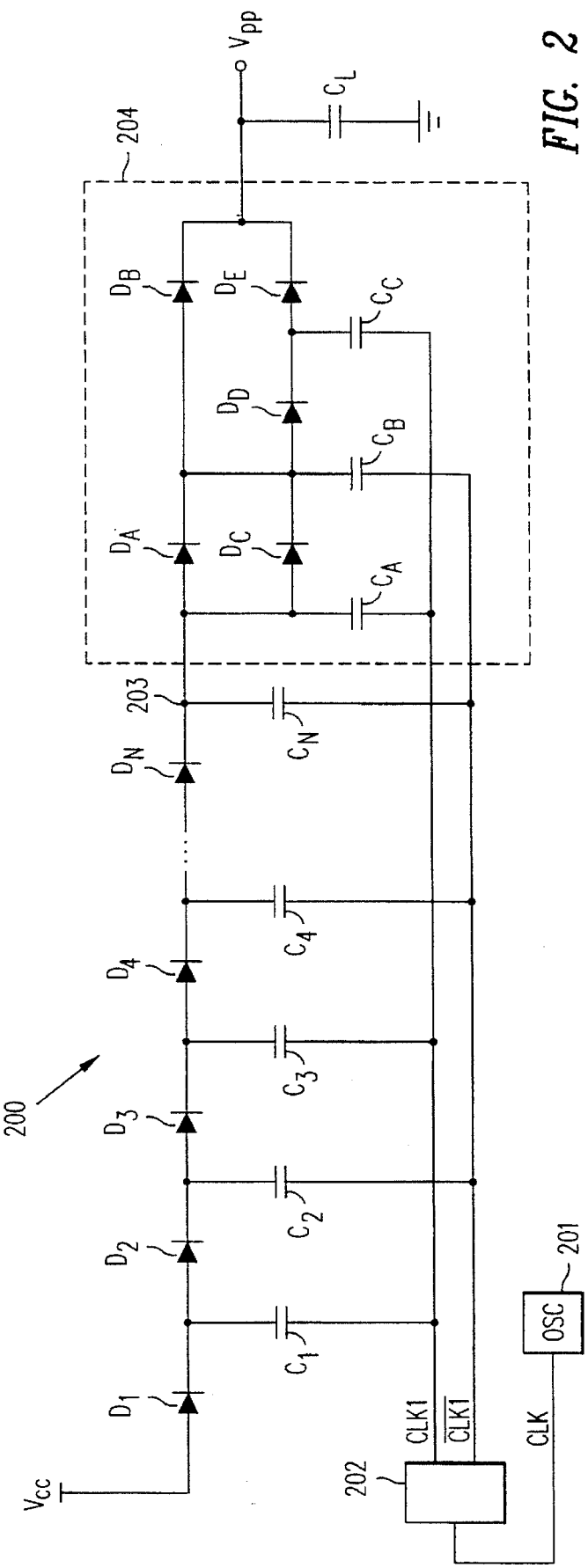
FIG. 2 is a schematic diagram of a charge pump circuit in accordance with one embodiment of the present invention.
Figures 4, 5:
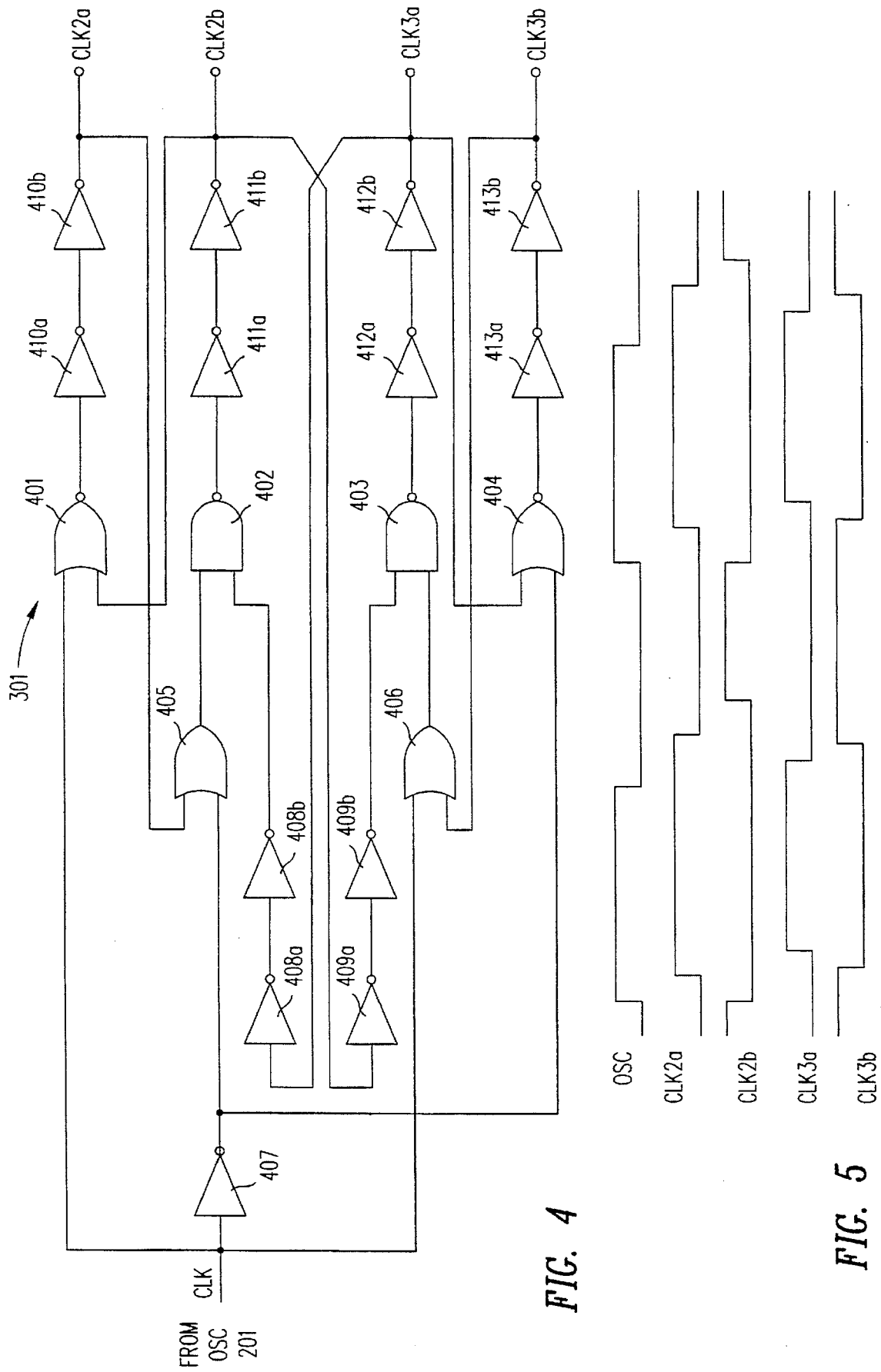
FIG. 4 is a schematic diagram of a clock control circuit employed in the embodiment of FIG. 3.
FIG. 5 is a timing diagram of clocking signals used in the embodiment of FIG. 3.

Referring now to FIG. 2, a high-efficiency charge pump circuit 200 includes an oscillator 201 of conventional design which provides a clock signal CLK having a frequency f to a clock control circuit 202. In response to clock signal CLK, control circuit 202 generates a clock signal CLK1 and an inverted clock signal $\overline{CLK1}$ in a well known manner. Preferably, CLK1 and its complementary clock signal $\overline{CLK1}$ are non-overlapping during high transitions, i.e., CLK1 and $\overline{CLK1}$ are never simultaneously high. In some embodiments, charge pumps in accordance with that shown in FIG. 2 may operate using clock signals CLK2 and $\overline{CLK1}$ generated which, as explained below, are generated by a clock control circuit 301 as illustrated in FIGS. 4 and 5.

Charge pump circuit 200 further includes an output terminal $V_{pp}$ having a capacitive load attached thereto, as shown by capacitor $C_L$, and N stages of series connected diode-capacitor voltage multipliers $D_i$, $C_i$, where i is a integer given by $1 \leq i \leq N$. Alternate ones of the diode-capacitor stages are connected to CLK1 and $\overline{CLK1}$ via bootstrap capacitors C, as shown in FIG. 2. That is, all odd numbered diode-capacitor pairs are coupled to receive clock signal CLK1 and all-even numbered diode-capacitor pairs are coupled to receive $\overline{CLK1}$. In this manner, successive diode-capacitor stages are charged on the high transitions of clock signals CLK1 and $\overline{CLK1}$ to produce a multiplied voltage at node 203 equal to approximately $$NV_{CC} - NV_{BE}$$

where N is the number of diode-capacitor stages, $V_{CC}$ is the supply voltage, and $V_{BE}$ is the voltage drop across each of diodes $D_1$–$D_N$.

An output stage 204 including diodes $D_A$, $D_B$, $D_C$, $D_D$, and $D_E$ and capacitors $C_A$, $C_B$, and $C_C$ is coupled between the Nth diode-capacitor voltage multiplier stage and output terminal $V_{pp}$, as shown in FIG. 2. Output stage 204 increases the efficiency of charge pump circuit 200 by ensuring that current flows to and thus charges output terminal $V_{pp}$ continuously during both high and low transitions of clock signal CLK1. The net effect of output stage 204 is that the effective clock frequency $f_e$ of charge pump circuit 200, and hence the output current provided to output terminal $V_{pp}$, is increased by a factor of approximately 2. Accordingly, the efficiency of charge pump 200 is increased.

When CLK1 transitions high, the respective anodes of diodes $D_A$ and $D_C$ are bootstrapped to higher potentials proportional to the amplitude of the clock phase, thereby forcing current to flow through diodes $D_A$ and $D_C$ and, as a result, charging capacitor $C_B$. When $\overline{CLK1}$ transitions high, the respective anodes of diodes $D_B$ and $D_D$ are bootstrapped to a higher potential. As a result, diode $D_B$ delivers current to the load $C_L$ at output terminal $V_{pp}$ while diode $D_D$ delivers current to, and thus charges, capacitor $C_C$. The next high transition of CLK1 bootstraps the anode of diode $D_E$ to a higher potential via capacitor $C_C$. As a result, diode $D_E$ delivers current to the load $C_L$ at output terminal $V_{pp}$. This high transition of CLK1 also charges capacitor $C_B$ by bootstrapping the respective anodes of diodes $D_A$ and $D_C$ to a higher potential via capacitor $C_A$, as described earlier. Note that in other embodiments diodes $D_A$ and $D_C$ may be implemented as a single diode element.

Figure 1:
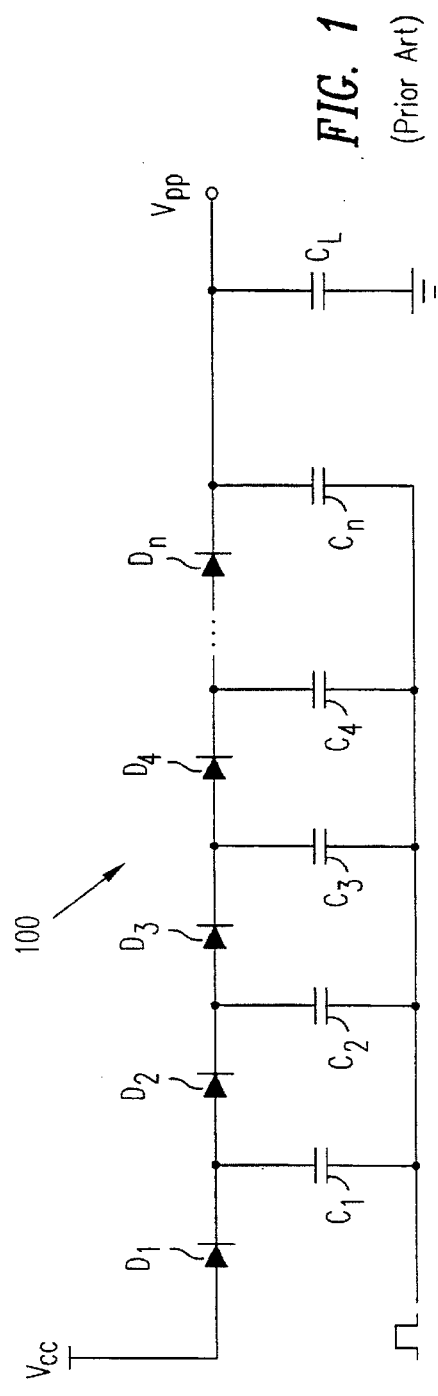
FIG. 1 is a schematic diagram of a conventional charge pump circuit.
Figure 3:
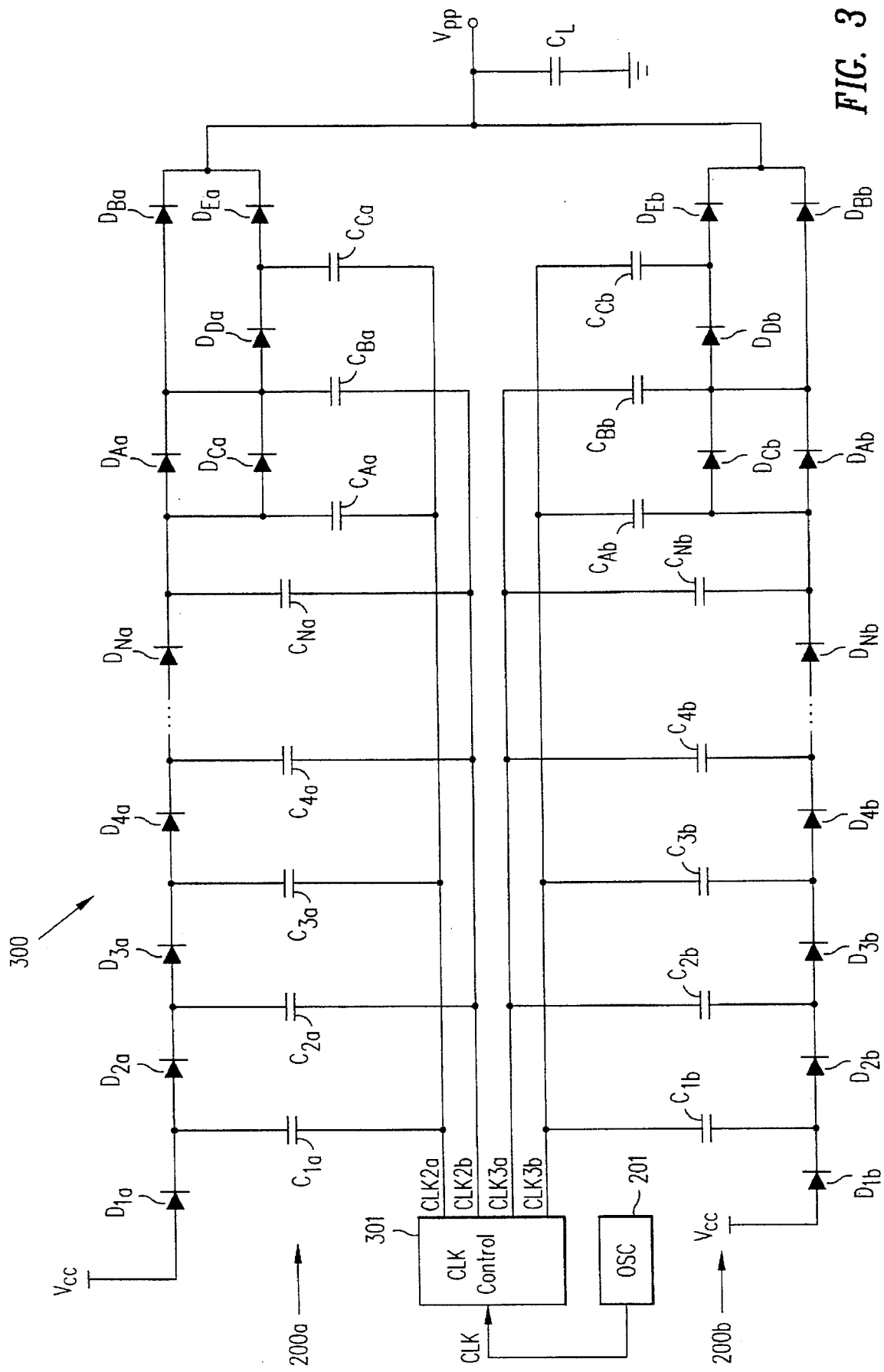
FIG. 3 is a schematic diagram of a charge pump circuit in accordance with another embodiment of the present invention.

In this manner, diodes $D_B$ and $D_E$ provide current to output terminal $V_{pp}$ on high transitions of complementary clock signals $\overline{CLK1}$ and CLK1, respectively. Thus, charge pump circuit 200 provides a substantially constant current flow to output terminal $V_{pp}$ during the entire period of the clock signal CLK1, i.e., during both low and high transitions of clock signal CLK1, thereby increasing the effective frequency $f_e$ of charge pump 200. In contrast, conventional charge pump circuits such as circuit 100 of FIG. 1 provide current to their respective output terminals in response to only the positive-going transitions of the clock signal CLK and, thus, charge the output only during approximately one-half the duty cycle of the clock signal CLK. Accordingly, by utilizing the entire period of the clock signal CLK1, charge pump circuit 200 is capable of providing a higher average current flow to output terminal $V_{pp}$ with only a minimal increase in circuit size.

Where it is desired to generate even greater currents to output terminal $V_{pp}$, a plurality of circuits 200 may be connected in parallel, where each of circuits 200 receives its own clock signal and an associated high-transition non-overlapping clock signal. For example, FIG. 3 shows a charge pump circuit 300 including two charge pump circuits 200a and 200b, where circuits 200a and 200b are each substantially identical in structure and operation to circuit 200 as described above and illustrated in FIG. 2. Accordingly, those components common to the embodiments of FIGS. 2 and 3 are similarly labelled.

Oscillator 201 provides a clock signal CLK having a frequency f to a clock control circuit 301 which, in turn, provides clock signals CLK2a and CLK2b to circuit 200a and provides clock signals CLK3a and CLK3b to circuit 200b. Preferably, clock signals CLK2a and CLK2b are non-overlapping during high transitions, and clock signals CLK3a and CLK3b are non-overlapping during high transitions.

FIG. 4 shows one implementation of clock circuit 301 which results in the generation of the clock signals CLK2a, CLK2b, CLK3a, and CLK3b as depicted in the timing diagram of FIG. 5. Referring also to FIG. 4, a raw clock signal CLK received from oscillator 201 is provided to input terminals of NOR gate 401 and OR gate 406 and its complement $\overline{CLK1}$ is provided to input terminals of NOR gate 404 and OR gate 405 via inverter 407. Clock signal CLK2a is provided as a feedback signal and gated with the signal $\overline{CLK1}$ via OR gate 405. The signal provided at the output terminal of OR gate 405 is gated with a delayed clock signal CLK3a by NAND gate 402 to produce clock signal CLK2b which, in turn, is provided as a feedback signal at an input terminal of NOR gate 401 to generate clock signal CLK2a and as a feedback signal at an input terminal of NAND gate 403 to produce clock signal CLK3a. Clock signal CLK3a is gated with clock signal $\overline{CLK}$ via NOR gate 404 to produce clock signal CLK3b which, in turn, is gated with clock signal CLK via OR gate 406. Inverter pairs 408a and 408b, 409a and 409b, 410a and 410b, 411a and 411b, 412a and 412b, and 413a and 413b provide suitable signal delays which when coupled with logic gates 401–406 decrease the duty cycle of clock signals CLK2b and CLK3b with respect to clock signals CLK2a and CLK3a, respectively, such that clock signals CLK2a and CLK2b are never simultaneously high and that clock signals CLK3a and CLK3b are never simultaneously high.

In a manner similar to that described above with respect to circuit 200 (FIG. 2), alternate stages of charge pump circuit 200a are coupled to respective clock signals CLK2a and CLK2b via associated ones of bootstrap capacitors $C_{1a}$–$C_{Na}$, while alternate stages of charge pump circuit 200b are coupled to respective clock signals CLK3a and CLK3b via associated ones of bootstrap capacitors $C_{1b}$–$C_{Nb}$. Thus, charge pump circuit 300, in addition to achieving all of the advantages of circuit 200, may output to $V_{pp}$ twice the current provided by circuit 200. In one embodiment, where $V_{CC}$ is equal to approximately 5.0 and capacitors $C_{1a}$–$C_{Na}$ and $C_{1b}$–$C_{Nb}$ are each 5.5 pF and where capacitors $C_A$, $C_B$, and $C_C$ are each 5.5 pF, circuit 300 is capable of providing approximately 900 μA at approximately 10 V to output terminal $V_{pp}$.

Figure 6:
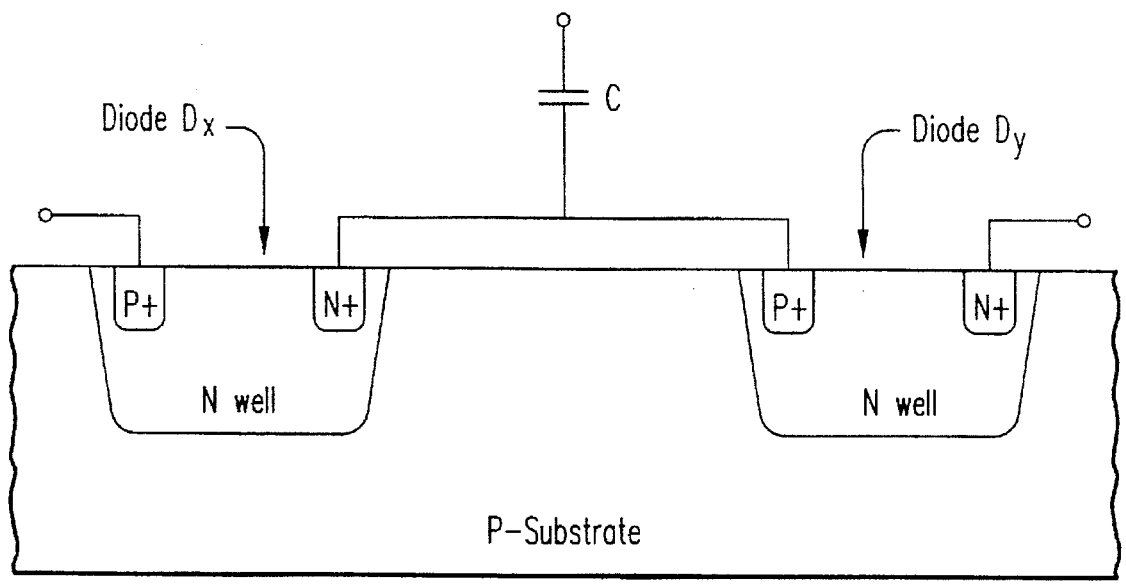
FIGS. 6 and 7 shown implementations of diodes employed in embodiments of the present invention.
Figure 7:
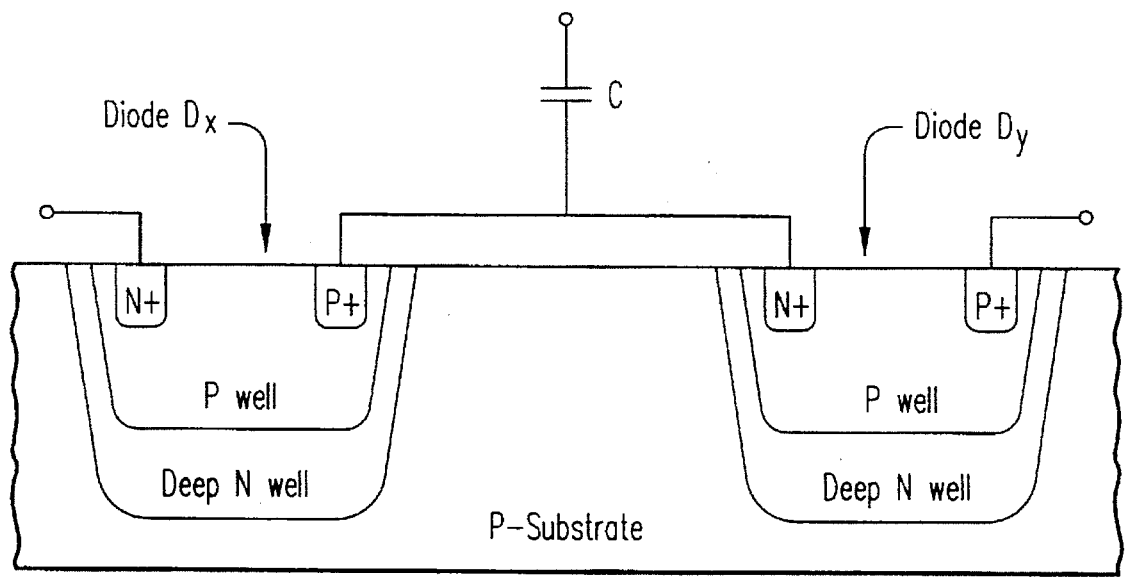

In some embodiments, the diode chains described above may be formed as a chain of diode-connected PMOS transistors (not shown). In such embodiments, the N-type wells of the diode-connected transistors are coupled to output terminal $V_{pp}$ to prevent body effects from influencing the threshold voltage $V_T$ of the PMOS devices. Coupling the wells in such a manner also advantageously prevents any degradation in efficiency resulting from $V_T$ drops between diode-capacitor stages when converting a low $V_{CC}$ voltage to a higher voltage at $V_{pp}$. FIGS. 6 and 7 illustrate two possible implementations of such diode chains, where diodes $D_x$ and $D_y$ and capacitor C are representative of the diodes and capacitors of the pump stages discussed above with respect to FIGS. 2 and 3. The embodiment of FIG. 6 utilizes single well technology, where the diodes are P+/N well junction diodes having an N+ cathode contact region and are formed in a P− substrate. The diode chain of FIG. 6 is capable of realizing a positive high voltage charge pump. The embodiment of FIG. 7 utilizes triple well technology, where the diodes are N+/P well junction diodes having a P+ anode contact region and are formed in deep N well regions which, in turn, are formed in a P− substrate. The diode chain of FIG. 7 is advantageous in realizing a negative high voltage charge pump since the $C/(C+C_s)$ ratio (see equation 1) is maximized. It is to be noted that the conductivity types described with reference to and illustrated in FIGS. 6 and 7 may be reversed while still realizing the benefits of the above-described embodiments in accordance with the present invention.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A charge pump circuit comprising:
   a clock control circuit for providing a clock signal and an inverted clock signal, said inverted clock signal being approximately 180 degrees out-of-phase with respect to said clock signal;

a plurality of diode-capacitor voltage multipliers connected in a chain, wherein alternate ones of said voltage multipliers are coupled to said respective clock and inverted clock signals; and an output stage for providing to an output terminal of said charge pump circuit current during both low and high transitions of said clock signal.

2. The circuit of claim 1, wherein said output stage comprises: first and second substages, said first substage providing current to said output terminal on high transitions of said clock signal, said second substage providing current to said output terminal on high transitions of said inverted clock signal.

3. The circuit of claim 2, wherein said first substage of said output stage further comprises:

a first diode having a cathode coupled to said output terminal and having an anode; and a first capacitor having a first plate coupled to said anode of said first diode and having a second plate coupled to receive said clock signal.

4. The circuit of claim 3, wherein said second substage of said output stage further comprises:

a second diode coupled between a first node and said output terminal; and a second capacitor having a first plate coupled to said first node and having a second plate coupled to receive said inverted clock signal, wherein a third diode is coupled between said first node and the commonly coupled first plate of said first capacitor and said anode of said first diode.

5. The circuit of claim 4, further comprising:

a third capacitor having a first plate coupled to the last diode-capacitor voltage multiplier and having a second plate coupled to receive said clock signal; and a fourth diode coupled between said first plate of said third capacitor and said first node.

6. The circuit of claim 5, wherein the last diode-capacitor voltage multiplier is coupled to receive said inverted clock signal.

7. The circuit of claim 2, wherein said diodes comprise diode-connected PMOS transistors.

8. The circuit of claim 2, wherein said each of said diodes comprises:

a P type substrate;

an N-well formed in said P type substrate; and

P+ and N+ regions formed in said N-well, said P+ region serving as an anode, said N-well serving as a cathode, and said N+ region serving as a contact for said cathode.

9. The circuit of claim 2, wherein said each of said diodes comprises:

a P type substrate;

a deep N-well region formed in said P type substrate;

a P-well formed in said deep N-well; and

P+ and N+ regions formed in said P-well, said N+ region serving as a cathode, said P-well serving as an anode, and said P+ region serving as a contact for said anode.

10. The circuit of claim 2, wherein said clock and inverted clock signals have non-overlapping high transitions.

11. A charge pump circuit comprising:

a clock control circuit for providing a plurality of clock signals and a plurality of associated inverted clock signals, wherein each of said inverted clock signals is approximately 180 degrees out-of-phase with respect to its associated clock signal;

a plurality voltage multiplier circuits, said voltage multiplier circuits each comprising a plurality of series connected diode-capacitor voltage multipliers, wherein the capacitors of each of said plurality of voltage multiplier circuits are alternately coupled to a selected one of said plurality of said clock signals and to an inverted clock signal associated with said selected one of said clock signals; and a plurality of output stages for providing to an output terminal of said charge pump circuit substantially equal current during low and high transitions of said clock signals.

12. The circuit of claim 11, wherein each of said output stages comprises first and second substages, said first substage providing current to said output terminal on high transitions of said clock signal, said second substage providing current to said output terminal on high transitions of said inverted clock signal.

13. The circuit of claim 12, wherein said first substage of said output stage further comprises:

a first diode having a cathode coupled to said output terminal and having an anode; and a first capacitor having a first plate coupled to said anode of said first diode and having a second plate coupled to receive said clock signal.

14. The circuit of claim 13, wherein said second substage of said output stage further comprises:

a second diode coupled between a first node and said output terminal; and a second capacitor having a first plate coupled to said first node and having a second plate coupled to receive said inverted clock signal, wherein a third diode is coupled between said first node and the commonly coupled first plate of said first capacitor and said anode of said first diode.

15. The circuit of claim 14, further comprising:

a third capacitor having a first plate coupled to the last diode-capacitor voltage multiplier and having a second plate coupled to receive said clock signal; and a fourth diode coupled between said first plate of said third capacitor and said first node.

16. The circuit of claim 15, wherein the last diode-capacitor voltage multiplier is coupled to receive said inverted clock signal.

17. The circuit of claim 12, wherein said diodes comprise diode-connected PMOS transistors.

18. The circuit of claim 12, wherein said each of said diodes comprises:

a P type substrate;

an N-well formed in said P type substrate; and

P+ and N+ regions formed in said N-well, said P+ region serving as an anode, said N-well serving as a cathode, and said N+ region serving as a contact for said cathode.

19. The circuit of claim 12, wherein said each of said diodes comprises:

a P type substrate;

a deep N-well region formed in said P type substrate;

a P-well formed in said deep N-well; and

P+ and N+ regions formed in said P-well, said N+ region serving as a cathode, said P-well serving as an anode, and said P+ region serving as a contact for said anode.

20. The circuit of claim 12, wherein said clock and inverted clock signals have non-overlapping high transitions.

* * * * *

UNITED STATES PATENT AND TRADEMARK OFFICE
CERTIFICATE OF CORRECTION

Figure 2A:
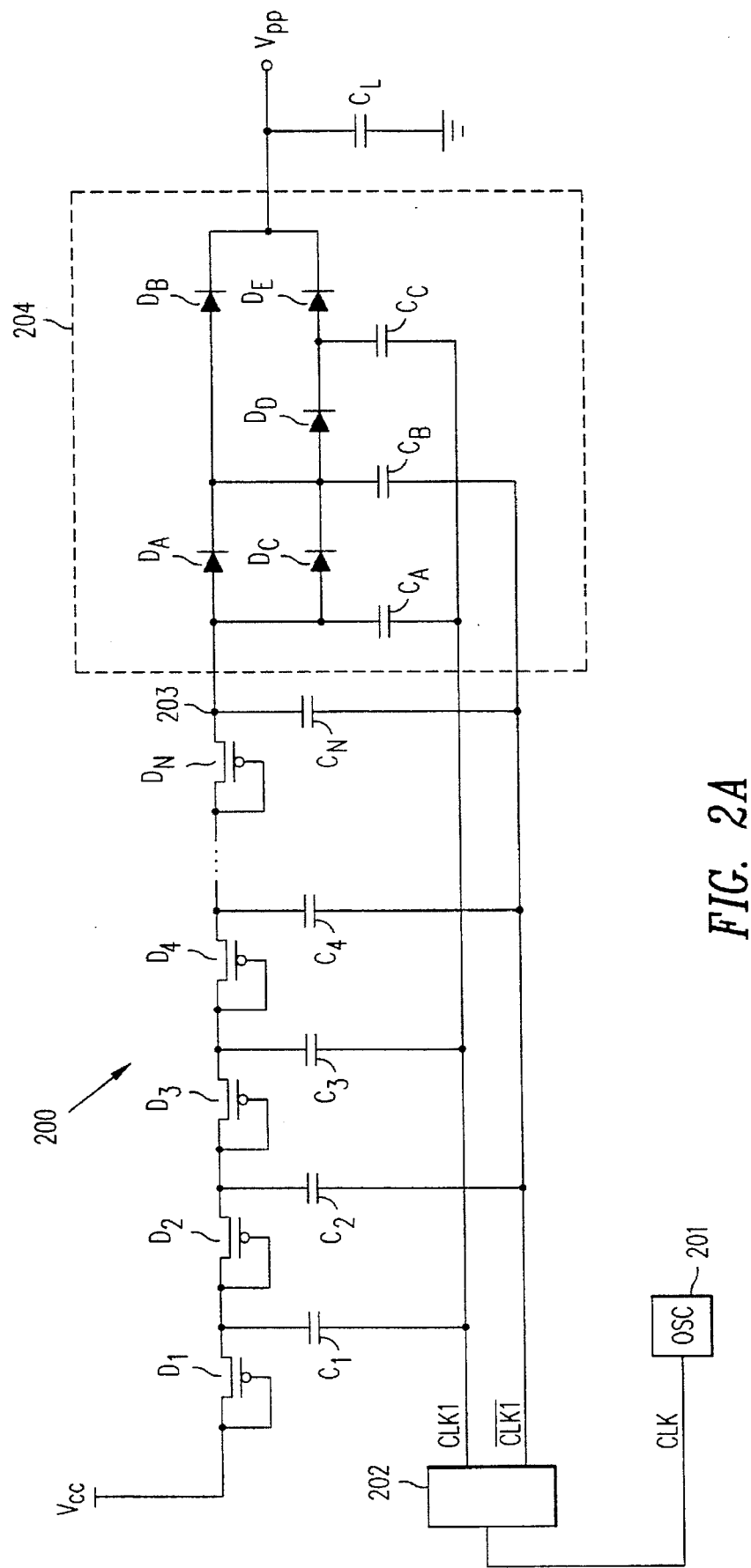
Figure 3A:
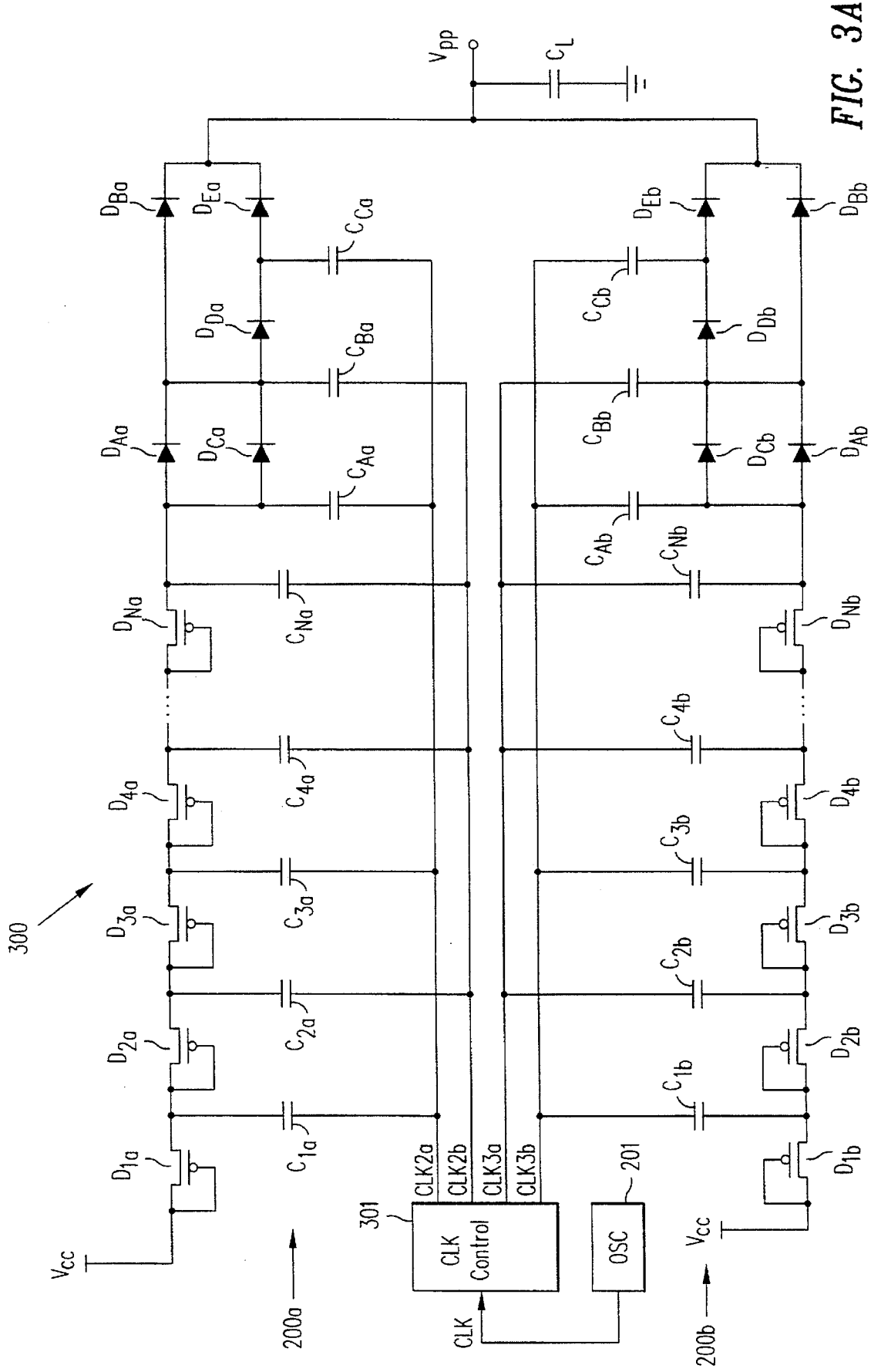

PATENT NO.   : 5,625,544
DATED        : Apr. 29, 1997
INVENTOR(S)  : Vikram Kowshik and Andy Teng-Feng Yu It is certified that error appears in the above-identified patent and that said Letters Patent is hereby corrected as shown below:

Column 1, line 10, delete "circuit's" and insert --circuits--.
Column 1, line 10, delete "(IC's)" and insert --(ICs)--.
Column 1, line 10, delete ".." and insert --.--.
Column 1, line 19, delete ";".
Column 1, line 37, delete the first occurrence of "voltage".
Column 1, line 66, delete "circuit" and insert --circuits--.
Column 2, delete line 5 and insert --FIGS. 2 and 2A are schematic diagrams of charge pumps in--.
Column 2, delete line 7 and insert --FIGS. 3 and 3A are schematic diagrams of charge pumps in--.
Column 4, line 30, delete "(not shown)" and insert --, as shown in FIGS. 2A and 3A--.
Column 4, line 37, start a new paragraph with "FIGS. 6 and 7".

Signed and Sealed this

Sixth Day of January, 1998

Attest:

BRUCE LEHMAN

*Attesting Officer*    Commissioner of Patents and Trademarks